March 27, 1962 W. F. KOSONOCKY 3,027,464

THREE STATE CIRCUIT

Filed May 26, 1960 2 Sheets-Sheet 1

INVENTOR.

Walter F. Kosonocky

BY John V. Regan

Attorney

INVENTOR.
Walter F. Kosonocky
BY John V. Regan
Attorney

United States Patent Office 3,027,464

Patented Mar. 27, 1962

3,027,464

THREE STATE CIRCUIT

Walter F. Kosonocky, Iselin, N.J., assignor to Radio Corporation of America, a corporation of Delaware Filed May 26, 1960, Ser. No. 31,875
7 Claims. (Cl. 307—88.5)

The invention described in this application is a new and improved multiple state circuit. The invention is useful in logic circuits and in memory circuits, however, it is not restricted to these uses.

An objective of the invention is to provide a simple circuit which is capable of assuming one of three stable states.

Another objective of the invention is to provide a circuit which is especially useful in an unsynchronized block reset system of computer logic.

The circuit of the invention includes, in series, two resistors, and two tunnel diodes connected to conduct forward current in the same direction. A resistor and one of the tunnel diodes lie on one side of an input terminal to the circuit and the other resistor and other tunnel diode lie on the other side of this input terminal. A quiescent voltage is applied to the series circuit at a level such that either or both tunnel diodes can be in the high state.

When one of the tunnel diodes is in its low state and the other tunnel diode is in its high state, the circuit is in one stable state; when the tunnel diode states reverse, the circuit is in a second stable state; and when both tunnel diodes are in the high state, the circuit is in a third stable state. The circuit may be placed in one of its three stable states by applying a positive, negative or zero pulse to the input terminal during the application to the series circuit of a forward current pulse of appropriate amplitude. Alternatively, the circuit may be reset (placed in its third stable state) by a forward current pulse of relatively high amplitude and subsequently placed in its first or second stable state by a positive or negative pulse applied to the input terminal.

The invention is described in greater detail in the discussion which follows and in the accompanying drawing in which.

Figure 3:
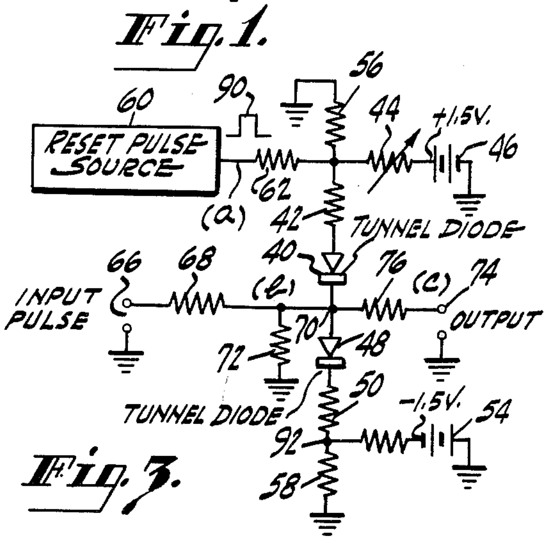
FIG. 3 is a block and schematic circuit diagram of a circuit according to the present invention.
Figure 4:
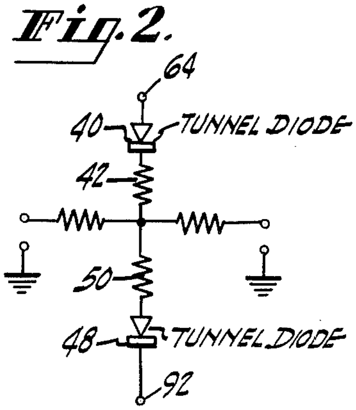
FIG. 4 is a schematic circuit diagram of a portion of the circuit of FIG. 3 in modified form.
Figure 5:
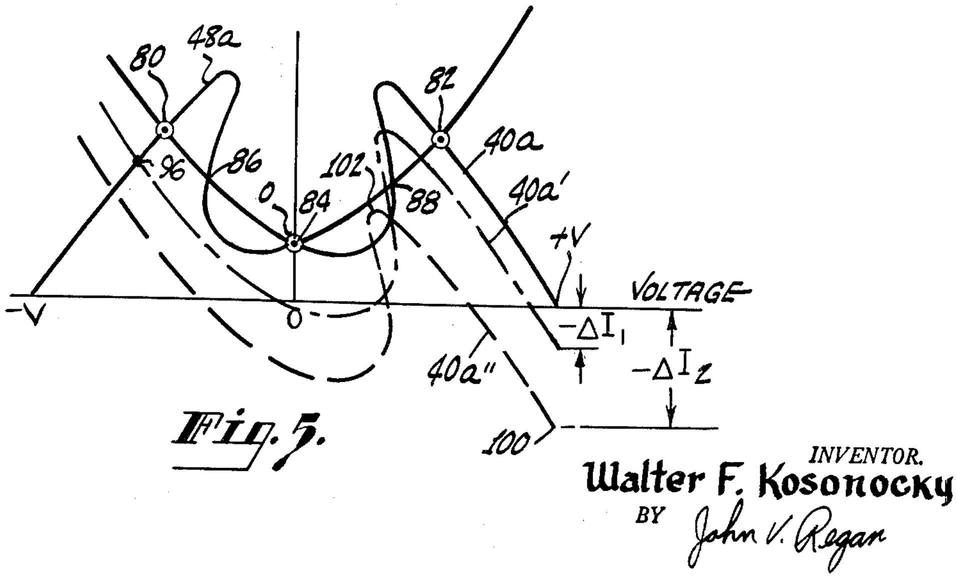
Figure 6:
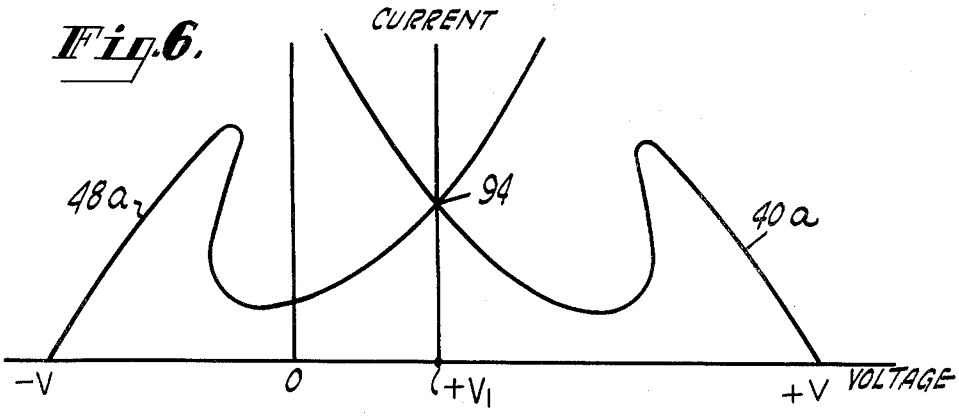
Figure 7:
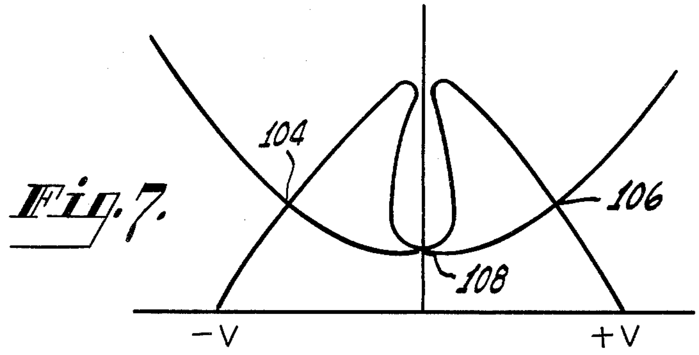
Figure 8:
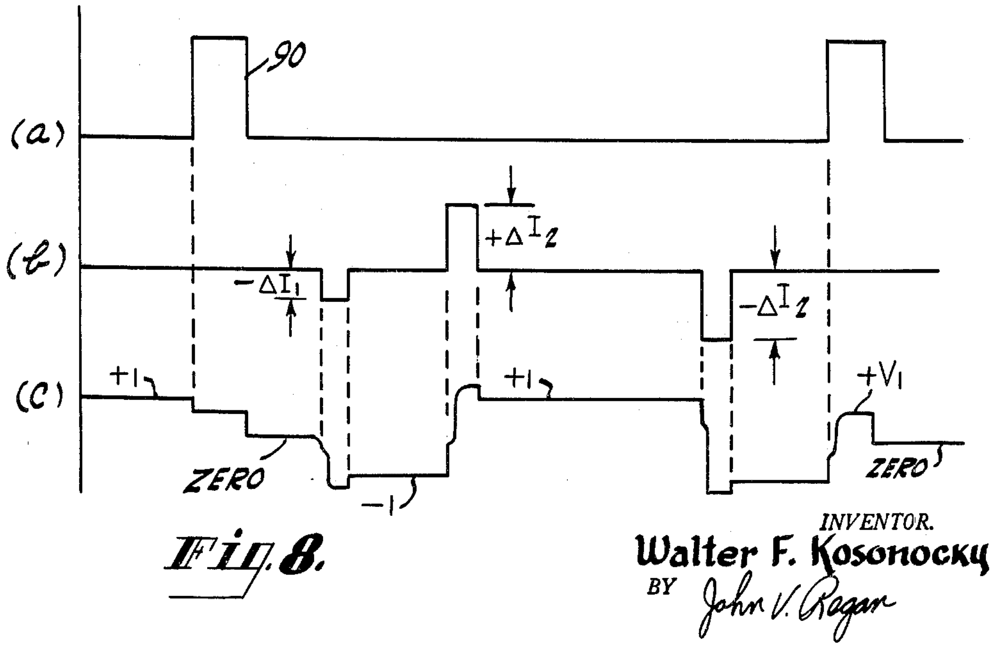

FIGS. 5, 6, and 7 are characteristic curves of current versus voltage to explain the operation of the circuit of FIG. 3 or 4; and FIG. 8 is a drawing of waveforms present at various points in the circuit of FIG. 3.

Figure 1:
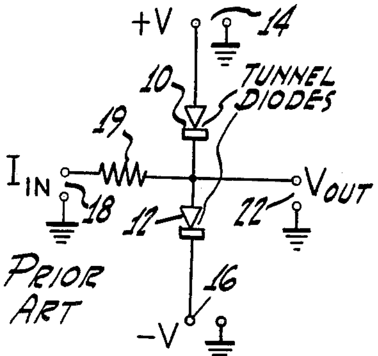
FIG. 1 is a schematic circuit diagram of a prior art tunnel diode circuit known as a "balanced pair"

The prior art balanced pair circuit of FIG. 1 includes a pair of tunnel diodes 10, 12 connected in series anode-to-cathode. A source of positive voltage, indicated schematically by the symbol +V, is connected to terminal 14 and a source of negative voltage, indicated schematically by the legend —V, is connected to terminal 16. An input signal, usually, a current pulse, is applied from terminal 18 through coupling resistor 19 to the common anode-cathode connection 20 of the balanced pair. The output voltage of the circuit may be sensed at terminal 22.

Figure 2:
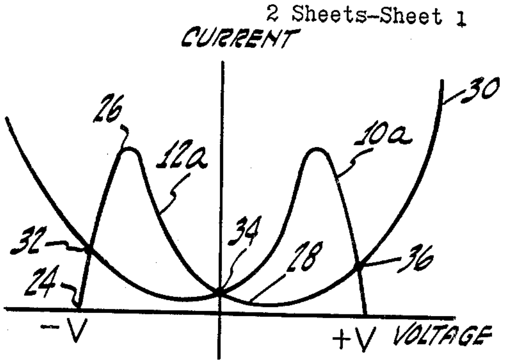
FIG. 2 is a characteristic curve of current versus voltage which describes the operation of the circuit of FIG. 1.

The characteristic curve of current through diode 12 versus voltage across diode 12 is shown at 12*a* in FIG. 2. As is well understood, the diode has two positive resistance operating regions 24, 26 and 28, 30 and a negative resistance operating region 26, 28 between these two positive resistance operating regions. The tunnel diode 10 can be thought of as a load on the tunnel diode 12 and can be represented by the curve indicated at 10*a* in FIG. 2. The intersections of the two characteristics with the voltage axis are +V and —V, respectively, the power supply voltages.

There are three points of intersection between curves 12*a* and 10*a*, namely 32, 34 and 36. At operating point 32, tunnel diode 10 is in the higher voltage positive resistance operating region, hereafter termed the "high state," and tunnel diode 12 is in the lower voltage positive resistance operating region, hereafter termed the "low state." At operating point 36, diode 12 is in the high state and diode 10 in the low state. At curve intersection 34, diodes 10 and 12 are both in their negative resistance operating regions. Operating points 32 and 36, since they both lie in stable operating regions of the two diodes, are stable operating points, however, since intersection 34 is in the negative resistance operating region of both diodes, it is an unstable operating point.

The circuit of FIG. 1 can be switched from one stable condition to another by applying pulses to input terminal 18 during the time voltages +V and —V are present. A positive current pulse of sufficient amplitude applied to terminal 18, switches diode 12 to the high state and diode 10 to the low state. A negative current pulse of sufficient amplitude applied to terminal 18, switches diode 10 to the high state and diode 12 to the low state.

In one mode of operation contemplated for the circuit of FIG. 1, the voltages +V and —V are from a pulse source and are applied during the interval that an input pulse is applied to terminal 18. When the pulses applied to terminals 14 and 16 are removed, the voltage at point 20 assumes a value of zero volts and the circuit is automatically reset.

A circuit according to the present invention is shown in FIG. 3. Each of the tunnel diodes 10 and 12 of FIG. 1 is replaced with a tunnel diode in series with a resistor. One of the tunnel diodes 40 is connected through its resistor 42 and a voltage divider resistor 44 to a source of positive voltage shown as a battery 46; the other tunnel diode 48 is connected through its resistor 50 and a voltage divider resistor 52 to a negative voltage source shown as a battery 54. Sources 46 and 54 may be a common source. Resistor 56 is part of the upper voltage divider and resistor 58 is part of the lower voltage divider. These resistors are of small value.

The reset means for the circuit of FIG. 3 includes a reset pulse source 60 connected through a coupling resistor 62 to terminal 64. An input pulse may be applied from terminal 66 through resistor 68 to input terminal 70. Resistor 72 is a load resistor and is returned to ground. The output from the circuit may be taken from terminal 74 which is connected through resistor 76 to terminal 70.

The operation of the circuit may be better understood by referring to FIG. 5. The characteristic of current through diode 48 and resistor 50 versus voltage across the series circuit of tunnel diode 48 and resistor 50 is as shown at 48*a*. The characteristic of current versus voltage for tunnel diode 40 in series with resistor 42, acting as a load on tunnel diode 48 and its resistor, is shown at 40*a*. It will be noted that the characteristic of the tunnel diode and resistor in series is somewhat different than that of the tunnel diode alone. The former is obtained by adding the voltage across the resistor to that across the diode for different values of current through the series circuit and the composite curve therefore has a larger incremental resistance $\Delta V/\Delta I$. In other words, the curve for the series circuit of resistor and tunnel diode is tilted toward the voltage axis with respect to the curve for the tunnel diode alone. There are five points of intersection between curves 40*a* and 48*a*. However, only three of them are stable. Intersection 80 corresponds to tunnel diode 48 in the low state and tunnel diode 40 in the high state. This intersection is hereafter termed the "−1" stable state of the circuit. Intersection 82 corresponds to tunnel diode 48 in the high state and tunnel diode 40 in the low state. This intersection is hereafter termed the "+1" stable state of the circuit. Intersection 84 corresponds to both tunnel diodes in the high state and this intersection is hereafter the "zero" stable state of the circuit. The other two curve intersections 86 and 88 each lie in a negative resistance operating region of a diode and are unstable.

In operation of the circuit the voltage across the two tunnel diodes and their series resistor 42 and 50, that is, the voltage across terminals 64, 92, is made such that the three stable intersections 80, 84, 82 above are possible, that is, either or both of the tunnel diodes can assume the high state. If, in addition to this quiescent voltage a relatively large current pulse 90 (FIGS. 3 and 8*a*) is applied from reset pulse source 60 to terminal 64, the effect is as indicated in FIG. 6. The voltage across the circuit, that is, between terminals 64 and 92 is substantially increased and the curves representing the tunnel diode resistor combination move apart. As can be seen from this figure, there is now only one intersection 94 between the two curves so that the circuit must operate there.

With a reset source 60 such as shown, the intersection 94 (FIG. 5), which represents the voltage between terminal 70 and ground (resistors 56 and 58 are of very small value and the voltage across them may be neglected), is at some positive value of voltage $+V_1$ during the reset interval and, after the reset pulse is removed, drops back to zero voltage as is indicated at 84 in FIG. 5. (This assumes that resistors 42 and 50 (FIG. 3) are of the same value, as is preferred and diodes 40 and 48 are similar.) On the other hand, it is to be understood that a balanced reset circuit can be employed. This may employ a source of positive current pulses, such as shown, connected to terminal 64 (FIG. 3) and a source of simultaneously occurring negative current pulses of the same amplitude connected to terminal 92. Now, during the reset interval, intersection 94 (FIG. 6) is at zero volts and, after the reset pulses are removed, point 94 remains at zero volts.

The circuit may be switched to the −1 stable state by applying a small negative current pulse $-\Delta I_1$ to input terminal 66. The effect of this pulse is to shift curve 40*a* with respect to curve 48*a* in a direction parallel to the current axis an amount $-\Delta I_1$ as is indicated at 40*a′* in FIG. 5. The operating point now moves from 84 to the left as viewed in the figure and, when there is no longer a stable intersection between curve 40*a′* and curve 48*a* corresponding to the high state of both diodes, diode 48 switches from the high state to the low state. The new operating point becomes 96. When the negative input pulse is removed, curve 40*a′* returns to its original position 40*a* and the operating point is 80, that is, the −1 stable state of the circuit.

The circuit can be switched from the −1 stable state to the +1 stable state by applying a positive current pulse $+\Delta I_2$ to terminal 60 of the circuit. This pulse must be of substantially larger amplitude, with the characteristics as shown, than the pulse which is required to switch the circuit from the zero state to the −1 state. In like manner, the circuit can be switched from the +1 state back to the −1 state by a negative current pulse $-\Delta I_2$. The effect of the application of such a pulse is shown in FIG. 5 by curve 40*a″*. It may be observed that the current pulse must be of sufficient amplitude so that there is no stable intersection between region 84, 82 of curve 48*a* and region 100, 102, of curve 40*a″* and that the current $-\Delta I_2$ is substantially greater than the current $-\Delta I_1$.

The waveforms present at various points identified by *a*, *b*, and *c* during the operation described above are as shown at FIG. 8 in the corresponding lines *a*, *b*, and *c*. These are believed to be self-explanatory. It should be clear from the discussion above that this circuit can be reset to the zero state by applying a pulse of sufficient magnitude across terminals 64 and 92 (FIG. 3). The circuit can be switched from the 1 state to the −1 state or the −1 state to the +1 state by pulses of appropriate polarity applied to input terminals 66.

The three state circuit described has a number of important applications. One is in a memory where it is desired to store ternary rather than binary information. In a circuit of this type, a reset pulse such as 90 is applied between terminals 64 and 92 and concurrently with the application of this pulse a positive (+1), negative (−1), or zero ("0") pulse is applied to input terminal 66. The amplitude of the reset pulse is such that the "0" pulse places both diodes in the high state, the +1 pulse places the circuit at operating point 82 (FIG. 5) and the −1 pulse places the circuit at operating point 80 (FIG. 5). The system is also useful in logic circuits such as those operating asynchronously in which it is desired at some predetermined time to reset all circuits. This is easily done by applying simultaneously to all logic stages, each of which includes the circuit between terminal 64 and 92, a reset pulse.

It is also possible to operate the circuit of FIG. 3 as a bistable rather than as a tri-stable circuit. So operated, a quiescent voltage is applied to the circuit across terminals 64 and 92 at a level insufficient to permit both diodes 40 and 48 to operate in the high state. Such operation is illustrated in FIG. 7. Note that intersections 104 and 106 are stable whereas intersection 108 is in the negative resistance operating region of the two diodes and is unstable.

In operation of the circuit, the quiescent voltage bias level may serve as a control of the circuit threshold sensitivity. For example, if in the circuit operation shown in FIG. 5, the quiescent bias voltage between terminals 64 and 92 is increased, the current pulse required to switch the circuit from the zero state to the +1 or −1 state is increased, and the current pulse required to switch the circuit out of the +1 or −1 state is decreased. With appropriate biasing it is possible to switch from the +1 or −1 state to the zero state without requiring a reset pulse such as 90. On the other hand, if the quiescent bias voltage is decreased, the current required to switch the circuit from zero to the +1 or −1 state decreases and eventually the zero state becomes unstable as is shown in FIG. 7.

In the circuit of FIG. 3, the diodes 40 and 48 are connected anode-to-cathode to a common terminal 70. It is to be understood that the circuit operates equally well with the diodes and resistors reversed as is indicated in FIG. 4 or with one diode-resistor combination reversed and the other not reversed.

A circuit according to the present invention has been operated with the following circuit values. These are illustrative but are not meant to be limiting. For example, in cases in which one stage is to drive or be driven by other like stages, coupling resistors, such as 68, should be made smaller and resistor 72 eliminated. The load represented by resistor 72 is then the resistance of the preceding and following stages.

Tunnel diodes 40 and 48=2 milliampere peak diodes
Voltage at terminals 64 and 94, respectively=+ and −300 millivolts
Resistors 42 and 50=100 ohms each
Resistors 56 and 58=1 ohm each
Resistor 68=1500 ohms
Resistor 72=150 ohms The invention has been described as being useful as a three state circuit and in block reset applications, however, a number of other applications are possible. For example, the circuit of FIG. 3 is useful as a comparator. In this application, first and second input pulses are concurrently applied through two input circuits, each like 66, 68, 72, to the common terminal 70. If these pulses are of the same amplitude and opposite polarity as, for example, may be the case with complementary digits, the effect is that of applying a zero to the circuit and a zero output is obtained. On the other hand, if both pulses applied are positive, then the circuit switches to the +1 state (82 in FIG. 5) and if both pulses are negative, the circuit switches to the −1 state (80 in FIG. 5). The voltages may be such that once the circuit is set to the +1 or −1 state, it remains there until reset by a reset pulse such as 90. Thus, once the circuit has made the comparison of, for example, corresponding digits in two serially presented complementary binary numbers, if any two digits compared are not complements, the circuit is set to the +1 or −1 condition and remains there until it is reset, even if later occurring digits in the numbers are complementary. Also, a number of circuits such as the one of FIG. 3 may be connected in cascade and the digits of two parallel multiple digit binary numbers compared.

What is claimed is:

1. A circuit comprising, in series, two resistors and two tunnel diodes connected to conduct forward current in the same direction, each of said diodes being capable of assuming one of two stable voltage states; means for applying a quiescent voltage to both of said diodes at a level such that either or both diodes can be in the higher one of said voltage states; and a terminal connected between one tunnel diode and resistor, and the other tunnel diode and resistor.

2. A circuit comprising, in series, two resistors and two tunnel diodes connected to conduct forward current in the same direction, each of said diodes being capable of assuming one of two stable voltage states; a common terminal to said circuit, one tunnel diode and resistor lying on one side of said terminal and the other tunnel diode and resistor lying on the other side of said terminal; means for applying a quiescent voltage to said series circuit at a level such that either or both diodes can be in the higher one of said voltage states; and means for applying a forward reset pulse to said series circuit for placing both diodes in said high state.

3. A circuit comprising, in series, two resistors of the same value and two tunnel diodes of like current peaks connected to conduct forward current in the same direction, each of said diodes being capable of assuming one of two stable voltage states; a common terminals to said circuit, one tunnel diode and resistor lying on one side of said terminal and the other tunnel diode and resistor lying on the other side of said terminal; means for applying a quiescent voltage to said series circuit at a level such that either or both diodes can be in the higher one of said voltage states; and means for applying a forward reset pulse to said series circuit for placing both diodes in said high state.

4. A circuit comprising, in series, two resistors and two tunnel diodes connected to conduct forward current in the same direction, each of said diodes being capable of assuming one of two stable voltage states; a common terminal to said circuit, one tunnel diode and resistor lying on one side of said terminal and the other tunnel diode and resistor lying on the other side of said terminal; means for applying a quiescent voltage to said series circuit at a level such that either or both diodes can be in the higher one of said voltage states; means for applying a forward reset pulse to said series circuit for switching both diodes to said high state; and means for applying an input current pulse to said terminal.

5. In the circuit as set forth in claim 4, said last-named means comprising means for applying a positive, negative or zero amplitude pulse to said terminal.

6. In the circuit as set forth in claim 4, said last-named means comprising means for applying a positive, negative or zero amplitude pulse to said terminal concurrently with the application of said reset pulse.

7. A circuit comprising, in series, two resistors and two tunnel diodes connected to conduct forward current in the same direction, each of said diodes being capable of assuming one of two stable voltage states; means for applying a quiescent voltage to both of said diodes at a level such that either or both diodes can be in the higher one of said voltage states; a terminal connected between one tunnel diode and resistor, and the other tunnel diode and resistor; and two input circuits connected to said terminal.

References Cited in the file of this patent

UNITED STATES PATENTS

| | | |
|---|---|---|
| 2,098,370 | Bartels | Nov. 9, 1937 |
| 2,944,164 | Odell et al. | July 5, 1960 |